July 7, 1964   R. J. STURM, JR   3,139,748
TESTER FOR ANTI-FRICTION BEARINGS
Filed Aug. 22, 1962   3 Sheets-Sheet 1
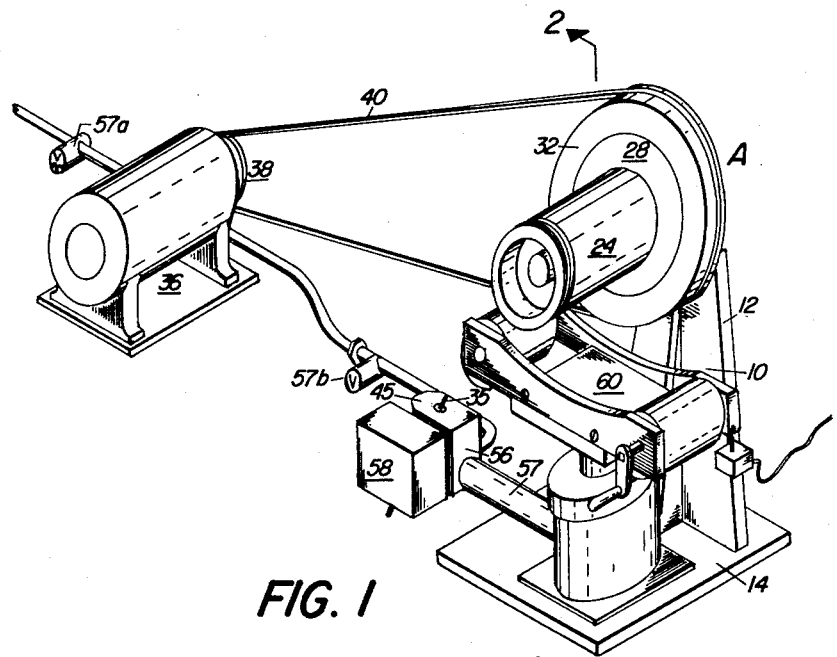
FIG. 1
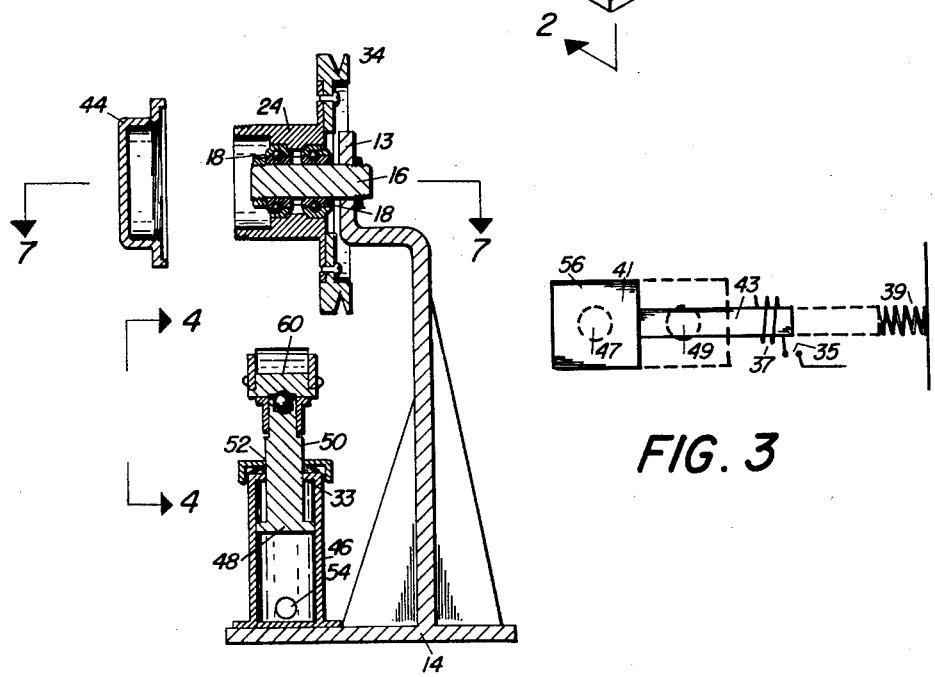
FIG. 2
FIG. 3
INVENTOR.
RUDOLPH J. STURM, JR
BY William F. Woods
ATTORNEY INVENTOR.
RUDOLPH J. STURM JR
BY William F. Woods
ATTORNEY July 7, 1964 R. J. STURM, JR 3,139,748
TESTER FOR ANTI-FRICTION BEARINGS
Filed Aug. 22, 1962 3 Sheets-Sheet 3
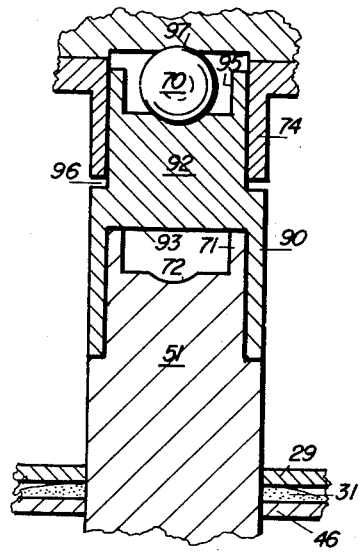
FIG. 6
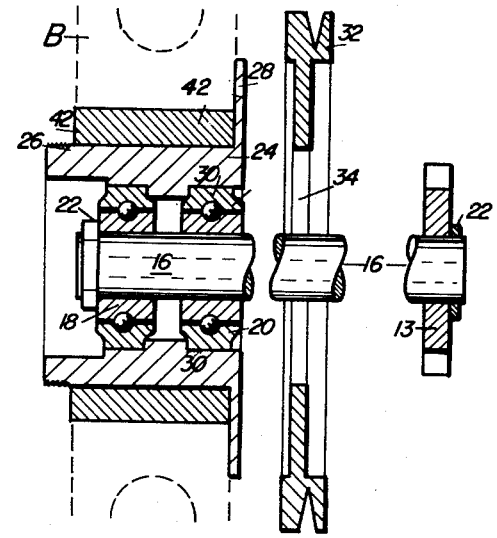
FIG. 7
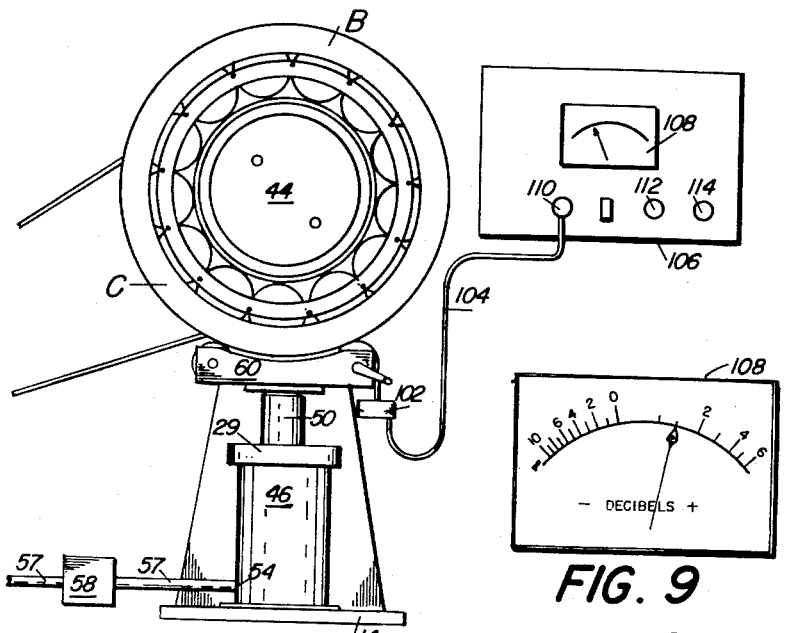
FIG. 8
FIG. 9
INVENTOR.
RUDOLPH J. STURM JR.
BY
William F. Woods
ATTORNEY

3,139,748
TESTER FOR ANTI-FRICTION BEARINGS
Rudolph J. Sturm, Jr., St. Paul, Minn., assignor to Great Northern Railway Company, St. Paul, Minn., a corporation of Minnesota
Filed Aug. 22, 1962, Ser. No. 218,636
10 Claims. (Cl. 73—67)

This invention relates broadly to a device for testing bearings of the anti-friction or rolling element type; in particular, it concerns novel means for detecting irregularities in an anti-friction bearing while it is rotated under load conditions approximating those encountered in actual operation.

In most segments of the railroad industry, for example, the traction motors going through the repair shops for periodic inspection and overhaul have their commutator and pinion end bearings tested to determine whether they are suited for further service or must be scrapped. Something in addition to a good visual test is required to make sure that the bearings are up to acceptable standards. Any device used for testing the bearings must provide a running test that is simple to operate, completely reliable in its results, and able to closely simulate the loading imposed under actual operating conditions. Tests have indicated that enough pressure must be exerted upon the bearing to prevent skidding of the rollers during the test to prevent scoring. To detect deviations from a predetermined standard, such devices may be equipped with means for monitoring the sound or noise level in the bearing during the test run. Optimum results are obtained when the entire inner race surface of the bearing is presented to the loading pressures developed by the testing machine. This is because surfaces that often visually appear smooth and free of imperfections may in fact be out of round, non-concentric or have flat spots hidden along the surfaces of the races. When such areas come into pressure running contact the sound or noise level created by the testing machine forces is increased. In order to detect flaws that may exist regardless of their position in the bearing it is necessary to move the outer race relative to the inner race during the testing operation. By providing for the hand control of this part of the testing procedure the testing sequence can be carried out quickly and accurately. A sound transducer or sonic probe is preferably mounted adjacent the pressure contact area of the device to pick up and transmit the sound intensities developed as the outer race is rotated relative to the inner race of the tested bearing. By amplifying and monitoring the resulting sound level, it is possible to observe the condition of the inner bearing surfaces and note when deviations from a predetermined standard occur.

Such a bearing testing device should also include means for adjusting the pressure exerted upon the bearings of different sizes and type. To test bearings of various sizes the machine must have interchangeable parts that will readily accommodate different sized bearings. And the device must have precise means for centering the bearings so that the large pressures required to simulate actual operating conditions can be transmitted without damaging either the machine or the bearings being tested. The test procedure should be non-destructive so that the useful life of the bearing will not be affected.

While some of the foregoing features have been incorporated in one form or another in various prior art machines, no device in current use has met fully the above-mentioned objectives. For example, some bearing testers employ resonance chambers and large housings for amplifying the sound generated. Others use conventional means for picking up and amplifying the sound level but rely upon complicated and expensive mechanical arrangements for placing the tested bearing under a given load. Furthermore, the problem of adequately lubricating a bearing while it is being test run under load conditions approximating actual service loads has been given very little attention. To my knowledge, none of the prior art devices provide means for rotating the outer race of the bearing relative to the inner race while the bearing is subjected to test loading conditions.

It is therefore a broad object of this invention to provide a testing device for rolling element bearings that will overcome the above disadvantages and limitations.

Another important object of this invention is to provide a testing device for anti-friction bearings that will meet the above listed requirements and desiderata.

Another primary object of this invention is to provide an improved testing device for bearings of the anti-friction or rolling contact type.

Another object of this invention is to provide a testing device for anti-friction bearings that presents the entire inner surface of the bearing to pressure contact conditions simulating actual running pressures and temperatures.

Yet another object of this invention is to provide in a testing device for anti-friction bearings novel means for rotating the outer race relative to the inner race during the testing operation.

Another object of this invention is to provide a testing device for anti-friction bearings that will accommodate bearings of different sizes and types.

Still another object of this invention is to provide in a device for testing bearings of the anti-friction type novel means for loading a tested bearing in combination with means for causing relative rotation between the inner and outer races of the bearing.

Another object of this invention is to provide novel and improved means for supporting a tested bearing while under simulated load conditions.

Yet another object of this invention is to provide a bearing testing device capable of monitoring the sound level produced under simulated pressure contact load conditions.

A further object of this invention is to provide a new and improved bearing testing device characterized by novel means for exerting a selected pressure against a tested bearing during running conditions.

A still further object of this invention is to provide a tester for anti-friction bearings that permits the lubrication of the tested bearing while running under full load conditions.

Another object of this invention is to provide a tester for anti-friction bearings that is relatively inexpensive to produce, easy to operate, rugged in construction and extremely durable.

A still further object of this invention is to provide a tester of the class described that utilizes sonic means to classify the bearings being tested, simulates the pressures and temperatures encountered under actual running conditions, is reliable in its results and adapted for use under ordinary shop conditions.

With the foregoing and other objects in view, which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings:

FIGURE 1 is a perspective view of the invention in its entirety, the means for amplifying the sound picked up by the transducing element being omitted for purposes of clarity;

FIGURE 2 is an enlarged fragmentary elevational view, partially in section, taken substantially along the line 2—2 of FIGURE 1;

FIGURE 3 is a diagrammatic representation of the valve means forming part of the invention;

FIGURE 6 is an enlarged view, partially in section, showing an alternate means of mounting the outer race support;

FIGURE 7 is an enlarged exploded view, partially in section, taken substantially along the line 7—7 of FIGURE 2, with the partial outline of a tested bearing being indicated by dotted lines;

FIGURE 8 is a front elevational view of the invention illustrating the bearing supporting and loading means and the means employed for amplifying and indicating the intensity of sound produced during a test run; and FIGURE 9 is an enlarged view of the decibel read-out meter used to provide a visual indication of the sound level produced during a test run.

Figure 4:
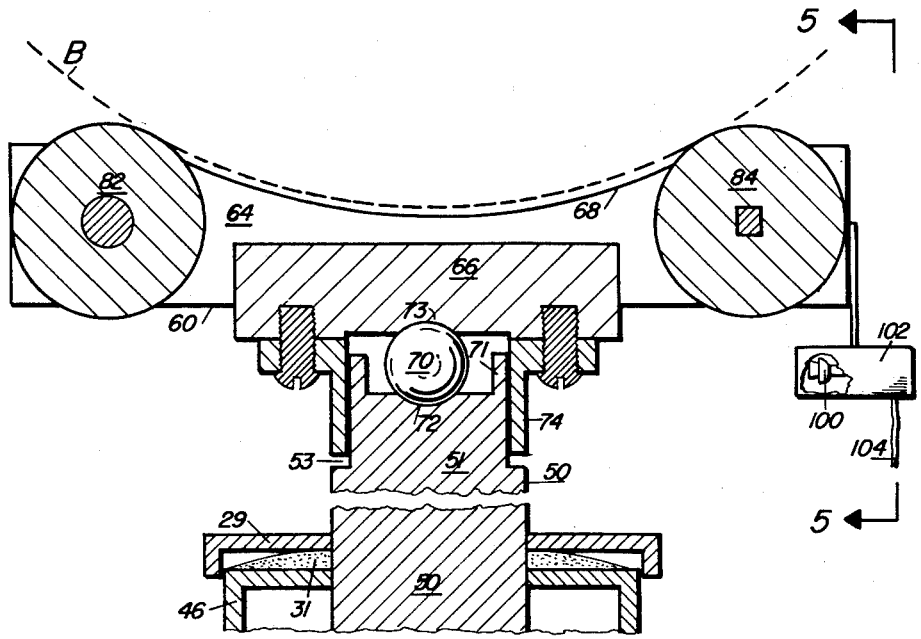
FIGURE 4 is a fragmentary enlarged view, partially in section, taken substantially along the line 4—4 of FIGURE 2.

Referring now to the drawings, the invention, indicated in its entirety by the reference character A, includes a rigid stand 10 having an upright supporting leg 12 and a flat base 14. The upper part of leg 12 terminates in a shaft support 13 which overhangs base 14. Carried by shaft support 13 is a fixed shaft or pintle 16 mounted in vertically spaced parallel relation to and overhanging base 14. The overhanging or cantilevered portion of shaft 16 is equipped with suitable bearings 18 of the rolling contact type, the outer races 20 thereof being freely movable about the axis of shaft 16, as illustrated in FIGURE 7. Suitable means 22 secure shaft 16 against axial movement with respect to shaft support 13 and base 14. A hub member 24 having a hollow shank 26 and a flat annular inner flange 28 is mounted in a fixed manner upon the rotatable outer races 20 of bearings 18, as indicated at 30 in FIGURE 7. Fastened to flange 28 of hub 24 is a driven sheave 32 that is centrally open, as at 34, to allow it to rotate freely about shaft 16 without interference with shaft support 13 of stand 10. An electric motor 36 equipped with a driving sheave 38 provides rotative energy to driven sheave 32 by means of a suitable V-belt 40. As shown in FIGURE 7, a filler sleeve 42 may be mounted upon shank 26 of hub 24 to accommodate a bearing of a particular size. An end cap 44 is provided to lock the tested bearing B (and filler sleeve 42, if required) in place on hub 24. Mounted upon base 14 immediately below the overhanging part of shaft 16 is a pressure cylinder 46. Cylinder 46 is equipped with a vertically movable piston 48 to which is attached an elongated piston rod 50, which extends through a sealed aperture 33 in the top of cylinder 46. As illustrated in FIGURES 2 and 7, piston rod 50 extends upwardly from cylinder 46 towards the middle of the overhanging part of shaft 16. This assembly constitutes a single acting pneumatically actuated pressure means for clamping saddle member 60 into pressure contact with the outer race C of tested bearing B, as will be explained. A splash shield 29 and sealing washer 31 is carried by the top of cylinder 46, as indicated in FIGURE 4.

Air is delivered to inlet 54 in the lower end of cylinder 46 through supply line 57 which is in communication with a suitable source of air pressure (not shown). Suitable pressure relief valve means 57a and a shut off valve 57b are provided. Reference character 56 indicates the valve means used to control the action of cylinder 46. As diagrammatically indicated in FIGURE 3, valve means 56 includes a valve piston 41 and plunger 43 mounted for axial movement within a valve body 45 (see FIGURE 1). A supply port 47 in body 45 in communication with inlet 54 of cylinder 46 and supply line 57 is normalled closed by valve body 45, as indicated by its solid line position in FIGURE 3. A relief port 49 in body 45 in communication with inlet 54 is also provided. A solenoid 37 and spring 39 operate to open and close valve 56. Normally toggle switch 35 is open and the coil of solenoid 37 is disabled; in this condition, spring 39 urges valve body 45 into a closed position with reference to supply port 47 and the system is inactive. Air in the cylinder is exhausted through relief port 49 which is open. Upon closing the contacts of toggle switch 35, the coil of solenoid 37 is energized resulting in the displacement of plunger 43 and valve body 45 in a direction away from supply port 47, as shown by the dotted line representation in FIGURE 3. Relief port 49 is closed and air under pressure is delivered through port 47 and inlet 54 into the head end of cylinder 46 whereby to drive saddle member 60 into clamping engagement with the tested bearing.

Reference character 58 indicates a converter (which may be of the Wheatstone bridge-circuit type) for supplying D.C. power to the coil of solenoid 37 where A.C. power is ordinarily available.

Figure 5:
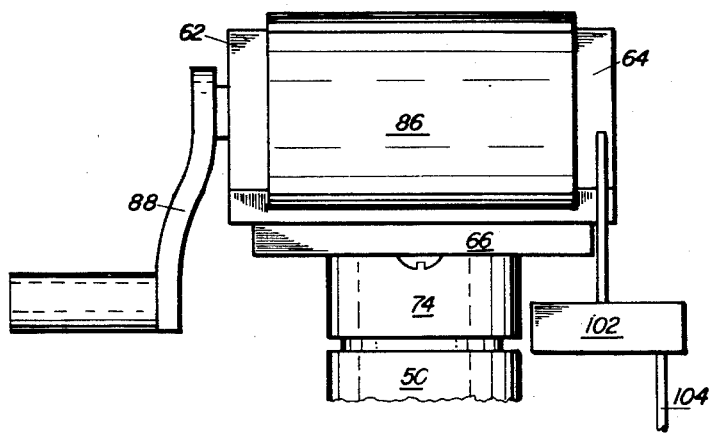
FIGURE 5 is a fragmentary end elevational view taken substantially along the line 5—5 of FIGURE 4.

Reference character 60 indicates a saddle-like member that is mounted on the end of piston rod 50 in spaced vertical relation to overhanging shaft 16. Its purpose is to clampingly engage and transmit pressure to the outer race of the tested bearing, the inner race being rotatably supported upon shaft 16, as explained. Saddle member 60, as shown in FIGURES 4 and 5 consists of an generally rectangular open body made up of spaced parallel sides 62, 64 rigidly connected by a central bottom plate 66. The upper contour of side plates 62, 64 is arcuate, as indicated at 68. Saddle member 60 is pivotally mounted upon piston rod 50 by means of a spherical member 70 forming a connection therebetween. As shown in FIGURE 4, spherical member 70 is contained within a central recess 71 formed in the top of piston rod 50 and the undersurface of bottom plate 66. Axially spaced central semi-hemispherical seats 72, 73 in piston rod 50 and bottom plate 66, respectively, provide supporting surfaces for spherical member 70.

A flanged connecting sleeve 74 fastened to the lower surface of bottom plate 66 is adapted to slidably engage a reduced diameter end portion 51 of piston rod 50, with axial clearance, as at 53, being provided to allow saddle member 60 to pivot slightly in a three-dimensional plane of rotation.

It can be seen that the axis of saddle member 60 is generally perpendicular to the axis of shaft 16. Carried at each end of saddle member 60, equidistant from the axis of shaft 16, are a pair of freely rotatable outer race engaging brass rollers 82, 84. Rollers 82, 84 are mounted so that they extend slightly above side plates 62, 64 and their axes of rotation are generally parallel to the axis of shaft 16. Roller 84 is equipped with a hand crank 88 to permit the rotation of the outer race of the tested bearing when rollers 82, 84 are in pressure contact therewith.

To facilitate the testing of bearings having varying internal and outside diameters I provide filler sleeve 42 to take care of the larger sized bearings. Of course, sleeve 42 may be varied according to the size of a particular bearing. Generally, if a bearing is large enough in its I.D. to require filler sleeve 42, it will be large enough in its O.D. to match the stroke of piston 48 without difficulty. However, if a smaller sized bearing is mounted upon hub 24 it may be necessary to provide a removable extension for the end of piston rod 50. For this purpose an extension member 90, as illustrated in FIGURE 6, may be used. Extension member 90 has a body 92 hollowed out at its lower end, as at 93, to fit over the reduced diameter end portion 51 of piston rod 50. The upper end of extension member 90 is bored and milled, as at 95, 97, in a manner similar to that described in connection with the upper end of piston rod 50 whereby to support spherical member 70 in connecting relationship with bottom plate 66. As shown in FIGURE 6, axial clearance 96 between body 92 and flanged sleeve 74 is provided.

Means for monitoring the sound level in the pressure contact area between rollers 82, 84 and the outer race of the tested bearing includes a microphone or pick up 100 mounted in a shielded case 102 (FIGURE 4) that is attached to saddle member 60 adjacent roller 84. A shielded lead 104 connects pickup 100 to an amplifier 106, which is equipped with a read-out meter 108, input jack 110, earphone jack 112 and a volume dial 114. Amplifier 106 is a conventional type having a frequency weighting network for the measurement of noise and sound levels according to its calibration in a particular case. The read-out meter 108 is provided with a scale graduated in decibels ranging from infinity at one end of the scale through the zero reading to a reading of +6 at the opposite end of the scale. It should be borne in mind that the sound level metering equipment described herein is not in itself novel but forms part of the monitoring means used in the testing process. For example, the foregoing hardware is marketed under the tradename "Sonoprobe" by the Aircraft Electronics Associates Company of West Hartford, Conn. Comparable equipment suitable for the purpose may be used with equal facility.

*Operation*

In the use and operation of the invention, the following steps are observed: The bearing to be tested is disassembled and checked visually for any cracks or surface imperfections that may be evident either in the rolling elements or in the races. If no flaws are found, the bearing is reassembled and the inner race is mounted on hub 24 and locked in place by tightening cap 44 with a spanner wrench. Then saddle member 60 is brought by hand into initial engagement with the outer race C of the tested bearing B. When rollers 82, 84 contact the outer race, switch 35 is toggled to its "on" position to open valve 56 and bring rollers 82, 84 of saddle member 60 into clamping engagement with outer race C. Pressure relief valve 57a is set to impose a load of about 350 pounds on the outer race.

Motor 36 is then started resulting in the rotation of the inner race while the outer race remains in a static condition. The monitoring means described is energized and the outer race is rotated by means of hand crank 88 either in the same direction or counter to the rotation of the inner race. Typically the inner race revolves at a speed of about 900 r.p.m., while the outer race is "tracked" around the inner race at a much slower pace in order to present its entire inner surface to the loading area between rollers 82, 84 at a rate commensurate with the time required to analyze and interpret the readings obtained during the test run.

A typical test run can be explained by reference to FIGURE 9 of the drawings. As shown, the dial of meter 108 is graduated from negative infinity through 0 to a +6 reading. By previously testing bearings proven entirely acceptable it was found that tested bearings producing a sound level below the 0 level on meter 108 were acceptable whereas those indicating a positive sound level in excess of the 0 level were not acceptable. Therefore, all bearings showing a reading of "0" or below are accepted, the others being rejected. When a reading of 0 or greater is observed, the machine may be stopped so that the area under load at the time the reading is obtained can be further examined, if necessary.

During the test run the bearing becomes heated due to the pressure exerted in the manner described. To dissipate the heat and to lubricate the bearing it is advisable to direct a stream of oil over the running bearing periodically during the test. Splash shield 29 on the top of cylinder 46 prevents oil from collecting on piston rod 50.

Thus there has been shown and described a tester for rolling element bearings that is reliable in operation, easy to use, and extremely efficient. The relatively narrow segmental pressure contact area between rollers 82, 84 and the outer race of the bearing makes it possible to concentrate relatively heavy predetermined loads upon the bearing and monitor the same under closely supervised control. By providing hand means for rotating the outer race while the bearing is under simulated load conditions it is easy to detect the exact location of any flaws in the bearing.

The invention has been thoroughly tested and found to be entirely satisfactory. While its use has been described in connection with the routines observed and bearings tested in a railway maintenance shop, it is obvious that any party having similar needs could use the device in the manner set forth. It should also be apparent that the pneumatically actuated outer race support system could be replaced by a comparable hydraulic system. In the detection and observation of the sound level produced by the tested bearing emphasis was placed upon a visual read-out; however, is is entirely possible to use ear phones or an oscillograph for the purpose of establishing a comparison of the tested bearing with a predetermined standard.

It is believed that the invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation with the purview of the invention as defined in the appended claims.

I claim:

1. In a device for monitoring the noise level of anti-friction bearings under simulated operating conditions, means including support means for rotating the inner race of an anti-friction bearing, a saddle engageable with the outer race of the said bearing, said saddle including means for rotating said outer race independently of the rotation of said inner race, means for advancing said saddle into clamping loading engagement with said outer race, and means for detecting the noise level produced by said bearing when its races are simultaneously and independently rotated.

2. The device of claim 1 wherein said saddle is equipped with a pair of spaced rollers engageable with the outer race of said bearing adapted to effect the independent rotation of said outer race relative to said inner race.

3. The device of claim 1 wherein said saddle advancing means includes a fluid pressure actuated piston member and a spherical bearing member carried by the said piston member pivotally mounting said saddle.

4. In a device for testing bearings of the rolling contact type, a stand, a pintle carried by said stand, means for rotatably mounting the inner race of a rolling contact type bearing on said pintle, means for rotating the said inner race, a fluid pressure cylinder, a piston rod actuated by said cylinder, an outer race support rockably mounted for limited pivotal movement on the end of said rod, a pair of spaced rollers engageable with the outer race of the bearing carried by said support, means for independently rotating the outer race of the bearing relative to the rotation of the inner race of the bearing, control means for advancing said support into loading engagement with the outer race, and means for detecting the noise level generated by the bearing when said outer race is rotated relative to the rotation of the inner race under simulated loading conditions.

5. In a device for testing bearings of the rolling element type having an inner and an outer race, a stand, a fixed shaft mounted on said stand, means for rotatably mounting the inner race of a rolling element bearing on said shaft, means for rotating the said inner race, a fluid pressure actuated piston rod in spaced relation to said shaft, a ball bearing member carried by the end of said piston rod, a saddle mounted on said piston rod engageable with and adapted for limited swivel movement about said ball bearing member, a pair of spaced rollers carried by said saddle engageable with the outer race of the said bearing, a hand engageable crank carried by one of said rollers operable to effect independent rotation of said outer race, sound detecting means carried by said cradle adjacent said outer race, and means including control means for supplying fluid under pressure to said piston rod whereby to advance said cradle and said rollers into clamping rolling engagement with the said outer race to simulate the load encountered by said bearing under operating conditions.

6. The device of claim 5 wherein said device is equipped with means adapted to mount and test bearings of differing inside and outside diameters.

7. The device of claim 6 wherein said adapting means consists of a hollow connector element surroundingly engageable with said piston rod having means for carrying said ball bearing member in contact with said cradle, and a sleeve carried by inner race mounting means.

8. A tester for rolling element bearings having an inner and an outer race including a rigid upright stand having a lower base portion, a pintle mounted on said stand in overhanging relation to the base thereof, an inner race mounting hub rotatably carried by said pintle, means for driving said hub, an air pressure cylinder mounted on the lower base portion of said stand beneath said hub, a piston mounted within said cylinder, a piston rod actuated by said piston extending from said cylinder in spaced vertical relation to said hub, means including control means for delivering air under pressure to said cylinder to impart upward vertical movement to said piston rod, an outer race supporting saddle rockably mounted on said piston rod between said cylinder and said inner race mounting hub, roller means carried by said saddle engageable with the outer race of a bearing mounted on said hub, means for rotating the outer race of the said bearing independently of the movement of the inner race thereof, and means for monitoring the sound level created in the area adjacent said saddle while said bearing is subjected to a peripheral load imposed by the delivery of air to said pressure cylinder.

9. The tester described in claim 8 wherein said outer race supporting saddle is positioned generally transverse to the axis of said inner race mounting hub.

10. The device of claim 8 wherein said roller means consists of a pair of circumferentially spaced outer race engaging rollers each having axes of rotation generally parallel to said inner race mounting hub, and wherein said means for rotating the outer race of the said bearing independently of the inner race thereof consists of hand engageable means operatively connected to at least one of said rollers.

References Cited in the file of this patent
UNITED STATES PATENTS

| | | |
|---|---|---|
| 2,763,152 | Birdsall | Sept. 18, 1956 |
| 2,796,759 | Baugh et al. | June 25, 1957 |
| 2,872,805 | Cochran et al. | Feb. 10, 1959 |